US007739745B2

(12) United States Patent
Ishimatsu et al.

(10) Patent No.: US 7,739,745 B2
(45) Date of Patent: Jun. 15, 2010

(54) INFORMATION-PROCESSING APPARATUS, INFORMATION-PROCESSING METHOD, PROGRAM, AND STORAGE MEDIUM

(75) Inventors: Kenji Ishimatsu, Kanagawa (JP); Hideo Tanaka, Kanagawa (JP); Hiroki Nitta, Saitama (JP); Hidekazu Kamon, Kanagawa (JP); Keiichi Nomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1277 days.

(21) Appl. No.: 11/227,210

(22) Filed: Sep. 16, 2005

(65) Prior Publication Data

US 2006/0071920 A1 Apr. 6, 2006

(30) Foreign Application Priority Data

Oct. 4, 2004 (JP) ............................. 2004-290996

(51) Int. Cl.
*G06F 21/22* (2006.01)
*G06F 15/16* (2006.01)
*G06F 3/00* (2006.01)

(52) U.S. Cl. ............................. 726/27; 705/51; 705/59
(58) Field of Classification Search ........................ None
See application file for complete search history.

(56) References Cited

U.S. PATENT DOCUMENTS

| | | | | |
|---|---|---|---|---|
| 5,438,370 A * | 8/1995 | Primiano et al. ............ 348/476 |
| 6,216,228 B1 * | 4/2001 | Chapman et al. ............ 713/176 |
| 6,771,914 B2 * | 8/2004 | Takamine et al. ............ 399/82 |
| 7,042,511 B2 * | 5/2006 | Lin ............................. 348/445 |
| 7,088,725 B1 * | 8/2006 | Kato ....................... 370/395.64 |
| 7,231,042 B2 * | 6/2007 | Kori et al. .................... 380/201 |
| 7,231,137 B2 * | 6/2007 | Himeno et al. ............... 386/112 |
| 7,316,032 B2 * | 1/2008 | Tayebi et al. .................... 705/51 |
| 7,376,243 B2 * | 5/2008 | Fudge et al. ................. 382/100 |
| 7,512,986 B2 * | 3/2009 | Shen-Orr et al. ............... 726/27 |
| 7,574,653 B2 * | 8/2009 | Croney et al. ................ 715/249 |
| 2003/0097575 A1 | 5/2003 | Owada et al. |
| 2003/0164973 A1 * | 9/2003 | Hisatomi et al. ............ 358/1.15 |
| 2004/0071443 A1 | 4/2004 | Kawamae et al. |
| 2005/0240530 A1 * | 10/2005 | Watanabe et al. .............. 705/52 |
| 2005/0244135 A1 * | 11/2005 | Yahata et al. .................. 386/52 |
| 2006/0088161 A1 * | 4/2006 | Hashimoto et al. .......... 380/201 |
| 2007/0124251 A1 * | 5/2007 | Shimizu et al. ................ 705/59 |
| 2008/0235221 A1 * | 9/2008 | Burns et al. ..................... 707/6 |
| 2008/0310819 A1 * | 12/2008 | Akiyama et al. ............... 386/94 |
| 2009/0154697 A1 * | 6/2009 | Shen-Orr et al. ............. 380/210 |

FOREIGN PATENT DOCUMENTS

WO  WO 97/28630  8/1997

* cited by examiner

*Primary Examiner*—Christopher A Revak
(74) *Attorney, Agent, or Firm*—Oblon, Spivak, McClelland, Maier & Neustadt, L.L.P.

(57) ABSTRACT

An information-processing apparatus comprises an acquisition unit configured to acquire information about a communication-method type from a display device connected to the information-processing apparatus, a determination unit configured to determine whether or not the display device is adapted to receive data on digital contents by using a predetermined copyright-protection technology based on the communication-method-type information, a conversion unit configured to convert an image quality of the digital contents based on the determination result, and an output unit configured to transmit the converted digital contents to the display device.

9 Claims, 10 Drawing Sheets

INFORMATION-PROCESSING APPARATUS, INFORMATION-PROCESSING METHOD, PROGRAM, AND STORAGE MEDIUM

CROSS REFERENCES TO RELATED APPLICATIONS

The present invention contains subject matter related to Japanese Patent Application JP 2004-290996 filed in the Japanese Patent Office on Oct. 4, 2004, the entire contents of which are incorporated herein by reference.

BACKGROUND OF THE INVENTION

1. Field of the Invention

The present invention relates to an information-processing apparatus, an information-processing method, a program, and a storage medium, and particularly relates to an information-processing apparatus, an information-processing method, a program, and a storage medium that are adapted to provide digital contents of an appropriate quality while protecting the copyright of the digital contents.

2. Description of the Related Art

In recent years, tuners for digital broadcasts (digital tuners) have been widely available, as a preparation for the change of the TV broadcast system, namely, from an analog-TV-broadcast system to a digital-TV-broadcast system. Further, high-quality (high-resolution) images (contents) have been increasingly provided via the digital broadcasts.

However, since the contents provided via the digital broadcasts are generated, as digital data, the contents can be easily copied by using a personal computer (PC). Namely, the contents provided via the digital broadcasts may be illegally copied. Therefore, contents-protection technologies including high-bandwidth digital contents protection (HDCP) or the like have been developed, so as to protect the copyright of high-quality digital contents. The HDCP technology allows encoding pixel data on the output side and decoding the encoded pixel data on the input side, so as to prevent high-quality video data, high-quality speech data, and so forth from being illegally copied in their original state.

Further, where digital contents are transmitted from a tuner to a display device including a monitor, a display, and so forth that do not support HDCP, it is stipulated that the resolution (image quality) of the digital contents should be reduced to a predetermined level (e.g., 525 p) or lower based on the association-of-radio-industries-and-businesses (ARIB) standard or the like, so as to protect the copyright of the digital contents.

For example, Japanese Unexamined Patent Application Publication No. 2002-261959 proposes a system wherein a moving image is recorded by a PC including a digital tuner, synthesized on a screen, and transmitted to a display device so that the display device produces the moving image.

SUMMARY OF THE INVENTION

In recent years, however, display units of PCs are often used, as TV receivers (display devices of the TV receivers). Therefore, HDCP-capable display units have been developed, as display units of PCs. On the other hand, there are many cases where a TV receiver that can support digital broadcasts is often used, as the display unit of a PC. In such cases, the resolution of digital contents should be changed according to the type of a display device connected to a tuner. However, there are no known technologies that can convert the image quality of digital contents according to the type of the display device.

According to the technology disclosed in Japanese Unexamined Patent Application Publication No. 2002-261959, where the moving image synthesized on the screen is an HD image, the display device produces the HD image in its original state. Further, an interface configured to connect the main body of a computer to the display device has no function of protecting a copyright. Therefore, if a recording device that can be connected to the above-described interface is connected in place of the display device, high-quality contents may be copied by the recording device.

Thus, the known technologies do not solve the above-described problems and provide digital contents of an appropriate quality while protecting the copyright of the digital contents.

Accordingly, the present invention allows providing digital contents of an appropriate quality while protecting the copyright of the digital contents.

An information-processing apparatus according to an embodiment of the present invention includes an acquisition unit configured to acquire information about a communication-method type from a display device connected to the information-processing apparatus, a determination unit configured to determine whether or not the display device is adapted to receive data on digital contents by using a predetermined copyright-protection technology based on the communication-method-type information, a conversion unit configured to convert an image quality of the digital contents based on the determination result, and an output unit configured to transmit the converted digital contents to the display device.

Where it is determined that the display device does not receive the data included in the digital contents by using the predetermined copyright-protection technology, the conversion unit converts the image quality of the digital contents.

Where a first image of the digital contents has a predetermined resolution or higher, the conversion unit converts the first image into a second image having a resolution lower than the predetermined resolution.

The acquisition unit acquires information about the type of a communication method used by the display device at predetermined time intervals during the digital contents are transmitted to the display device.

The digital contents are provided via a digital broadcast and the information-processing apparatus further includes an extraction unit configured to receive the digital broadcast and extract data on the digital contents.

The digital contents are stored in at least one storage medium and the information-processing apparatus further includes an extraction unit configured to extract data on the digital contents from the storage medium according to a method appropriate for protecting the copyright of the digital contents.

An information-processing method according to another embodiment of the present invention includes the steps of acquiring information about a communication-method type from a display device connected to an information-processing apparatus, determining whether or not the display device is adapted to receive data included in digital contents by using a predetermined copyright-protection technology based on the communication-method-type information, controlling conversion of an image quality of the digital contents based on the determination result, and outputting the converted digital contents to the display device.

A program according to another embodiment of the present invention is used for an information-processing apparatus configured to acquire data on digital contents, and record and/or reproduce the digital contents. The program makes a computer execute the steps of controlling acquisition of information about a communication-method type from a display device connected to the information-processing apparatus, controlling determination of whether or not the display device is adapted to receive data included in the digital contents by using a predetermined copyright-protection technology based on the communication-method-type information, and controlling conversion of an image quality of the digital contents transmitted to the display device based on the determination result.

A storage medium according to another embodiment of the present invention stores a program used for an information-processing apparatus configured to acquire data on digital contents, and record and/or reproduce the digital contents. The program makes a computer execute the steps of controlling acquisition of information about a communication-method type from a display device connected to the information-processing apparatus, controlling determination of whether or not the display device is adapted to receive data included in digital contents by using a predetermined copyright-protection technology based on the communication-method-type information, and controlling conversion of the image quality of the digital contents transmitted to the display device based on the determination result.

According to any one of the above-described information-processing apparatuses, information-processing methods, and programs, information about a communication-method type is acquired from the display device connected to the information-processing apparatus, it is determined whether or not the display device is adapted to receive data included in digital contents by using a predetermined copyright-protection technology based on the communication-method-type information, conversion of an image quality of the digital contents is controlled based on the determination result, and the converted digital contents are outputted to the display device.

The present invention allows providing digital contents of an appropriate quality while protecting the copyright of the digital contents.

DESCRIPTION OF THE PREFERRED EMBODIMENTS

Before describing embodiments of the present invention, the correspondence between the features of the claims and the specific elements disclosed in the embodiments of the present invention is discussed below. This description is intended to assure that specific elements disclosed in the embodiments supporting the claimed invention are described in this specification. Thus, even if an element in any one of the embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in any one of the embodiments are described in the claims. That is, the description does not deny the existence of aspects of the present invention that are described in any one of the embodiments but not claimed in the invention of this application, i.e., the existence of aspects of the present invention that in future may be claimed by a divisional application, or that may be additionally claimed through amendments.

An information-processing apparatus according to an embodiment of the present invention includes an acquisition unit (e.g., an HDCP-control unit 60 shown in FIG. 2 configured to perform monitor-type checking shown in FIG. 4) configured to acquire information about the type of a communication method from a display device (e.g., a monitor 11 shown in FIG. 1) connected to the information-processing apparatus, a determination unit (e.g., an image-quality-control unit 101 shown in FIG. 3 configured to perform processing, at step S32 shown in FIG. 5) configured to determine whether or not the display device is a display device (a monitor supporting high-bandwidth digital content protection (HDCP)) adapted to receive data included in digital contents by using a predetermined copyright-protection technology (e.g., a communication method performed based on the standard of association of radio industries and businesses (ARIB)) based on the communication-method-type information acquired by the acquisition unit, a conversion unit (e.g., a converter 57 shown in FIG. 2) configured to convert the image quality of the digital contents based on the determination result, and an output unit (e.g., a DVI I/F 61 shown in FIG. 2) configured to transmit the converted digital contents to the display device.

If it is determined that the display device does not receive the data included in the digital contents by using the predetermined copyright-protection technology, the conversion unit provided in an information-processing apparatus according to another embodiment of the present invention converts the image quality of the digital contents. For example, the converter 57 is turned on, at step S33 shown in FIG. 5.

Where an image of the digital contents has a predetermined resolution or higher, that is to say, where the image is an HD image, the conversion unit of an information-processing apparatus according to another embodiment converts the image of the digital contents into an image having a resolution lower than the predetermined resolution (e.g., an SD image).

Figure 4:
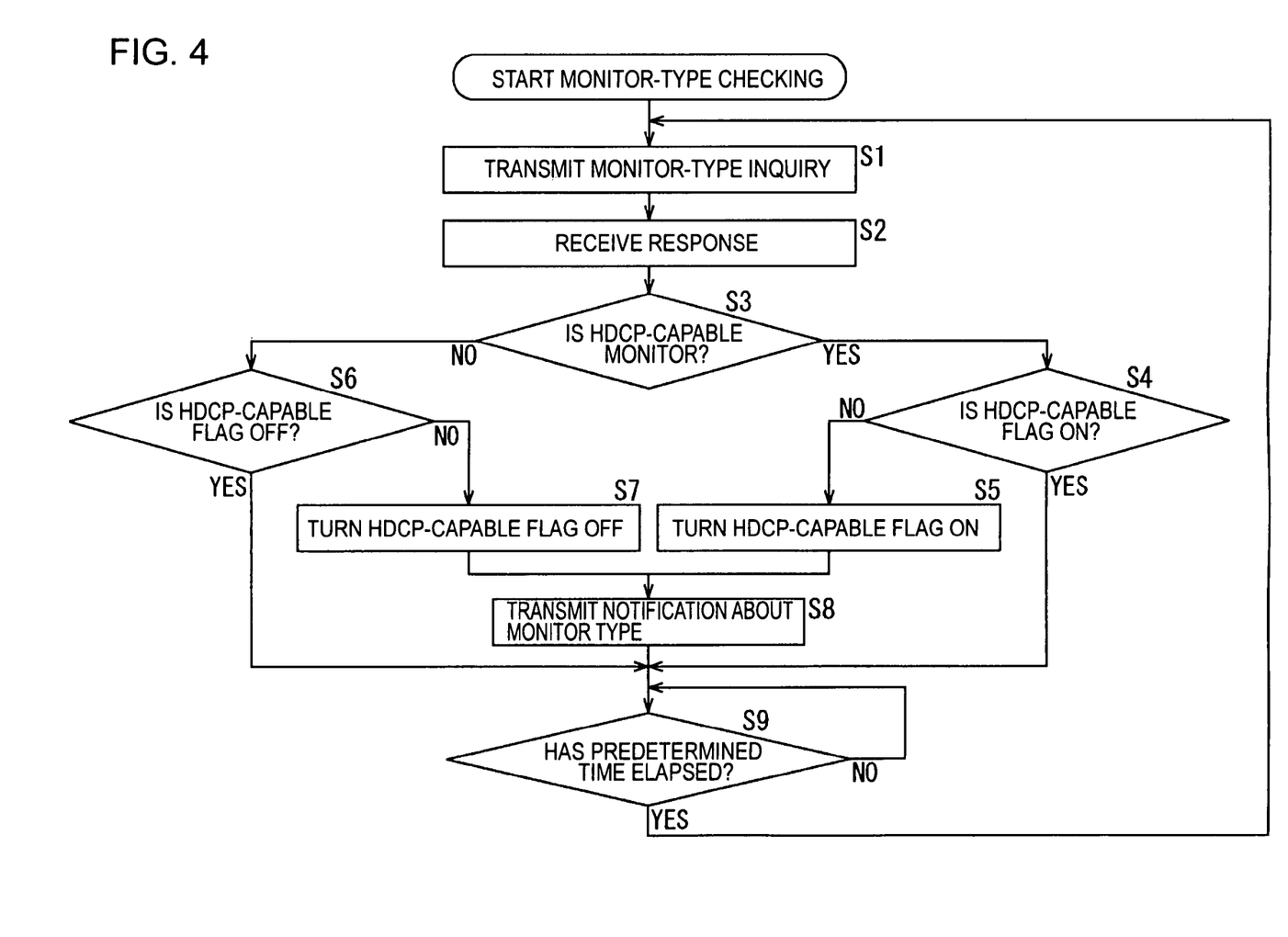
FIG. 4 is a flowchart illustrating the monitor-type checking.

In an information-processing apparatus according to another embodiment, the acquisition unit can acquire information about the type of the communication method used by the display device at predetermined time intervals (e.g., predetermined time intervals determined, at step S9 shown in FIG. 4) during the digital contents are transmitted to the display device.

In the case of an information-processing apparatus according to another embodiment, the digital contents are provided via a digital broadcast. The information-processing apparatus further includes an extraction unit (e.g., a tuner 54 shown in FIG. 2) configured to receive the digital broadcast and extract data on the digital contents.

In the case of an information-processing apparatus according to another embodiment, the digital contents are stored in a storage medium. The information-processing apparatus further includes an extraction unit (e.g., an iLINK I/F 55 shown in FIG. 2) configured to extract data on the digital contents from the storage medium according to a method adapted to protect the copyright of the digital contents (e.g., a DTCP protocol).

An information-processing method according to another embodiment of the present invention includes the steps of acquiring information about the type of a communication method from a display device (e.g., the monitor 11 shown in FIG. 1) connected to an information-processing apparatus (e.g., processing performed, at step S31 shown in FIG. 5), determining whether or not the display device is a display device (a monitor supporting HDCP) adapted to receive data included in digital contents by using a predetermined copyright-protection technology (e.g., a communication method performed based on ARIB according to the acquired communication-method-type information (e.g., processing performed, at step S32 shown in FIG. 5), and controlling conversion of the image quality of the digital contents based on the determination result (e.g., processing performed, at step S33, or step S34). The converted digital contents are transmitted to the display device.

A program according to another embodiment of the present invention is used by an information-processing apparatus (e.g., a PC shown in FIG. 9) configured to acquire data on digital contents, and store and/or reproduce the digital contents. The program makes a computer execute the steps of controlling acquisition of information about the type of a communication method from a display device (e.g., the monitor 11 shown in FIG. 1) connected to the information-processing apparatus (e.g., processing performed, at step S31 shown in FIG. 5), controlling determination about whether or not the display device is a display device (a monitor supporting HDCP) adapted to receive data included in the digital contents by using a predetermined copyright-protection technology (e.g., a communication method performed based on the standard of ARIB) according to the acquired communication-method-type information (e.g., the processing performed, at step S32 shown in FIG. 5), and controlling conversion of the image quality of the digital contents transmitted to the display device based on the determination result (e.g., the processing performed, at step S33, or step S34 shown in FIG. 5).

Figure 9:
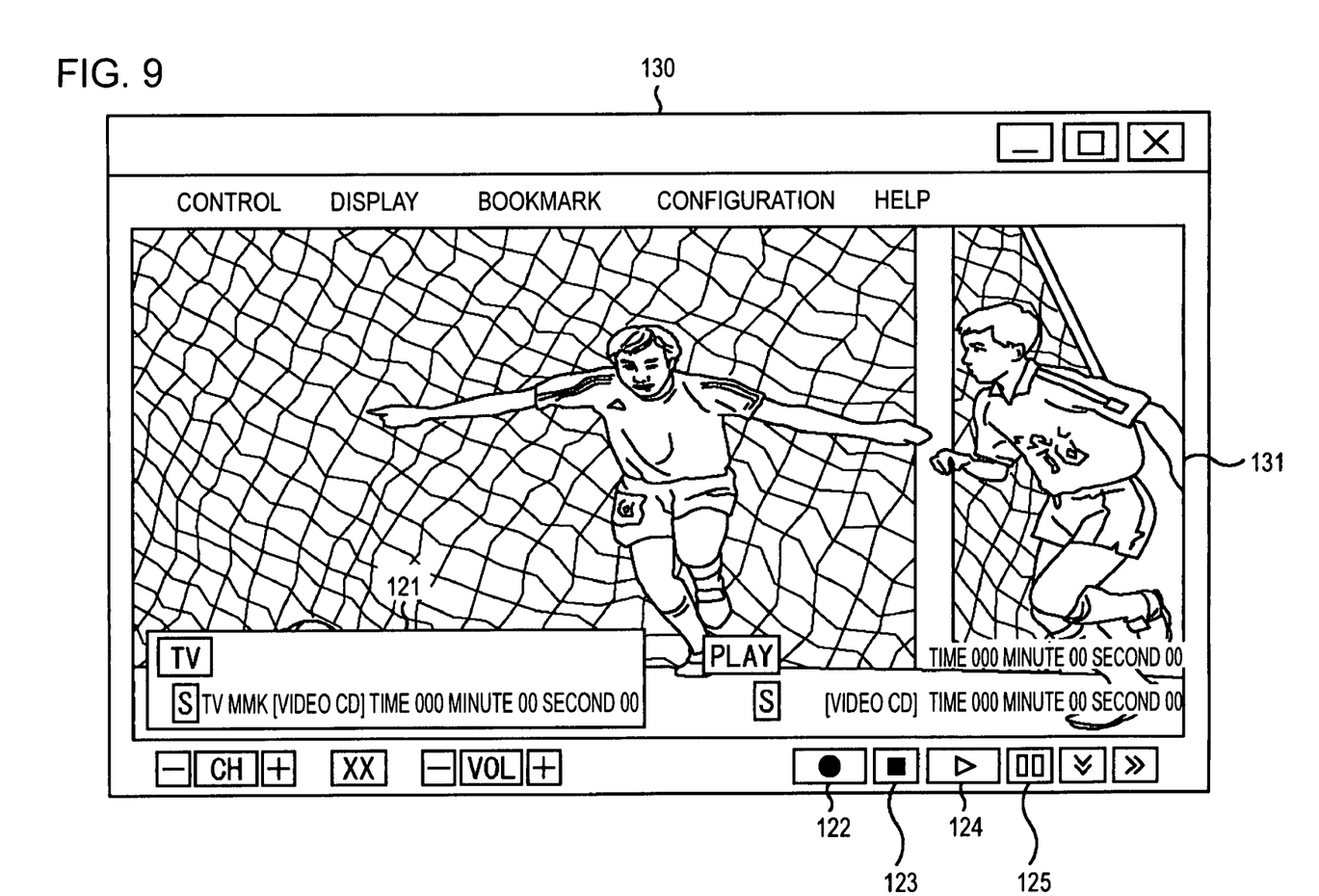
FIG. 9 shows an example display image of a child screen produced in the GUI shown in FIG. 8.

A storage medium according to another embodiment of the present invention stores a program used by an information-processing apparatus (e.g., the personal computer shown in FIG. 9) configured to acquire data on digital contents and store and/or reproduce the digital contents (e.g., any one of storage mediums 241, 242, 243, and 244 shown in FIG. 9). The program makes a computer execute the steps of controlling acquisition of information about the type of a communication method from a display device (e.g., the monitor 11 shown in FIG. 1) connected to the information-processing apparatus (e.g., processing performed, at step S31 shown in FIG. 5), controlling determination about whether or not the display device is a display device (a monitor supporting HDCP) adapted to receive data included in the digital contents by using a predetermined copyright-protection technology (e.g., a communication method performed based on the standard of ARIB) according to the acquired communication-method-type information (e.g., the processing performed, at step S32 shown in FIG. 5), and controlling conversion of the image quality of the digital contents transmitted to the display device based on the determination result (e.g., the processing performed, at step S33, or step S34 shown in FIG. 5).

Figure 1:
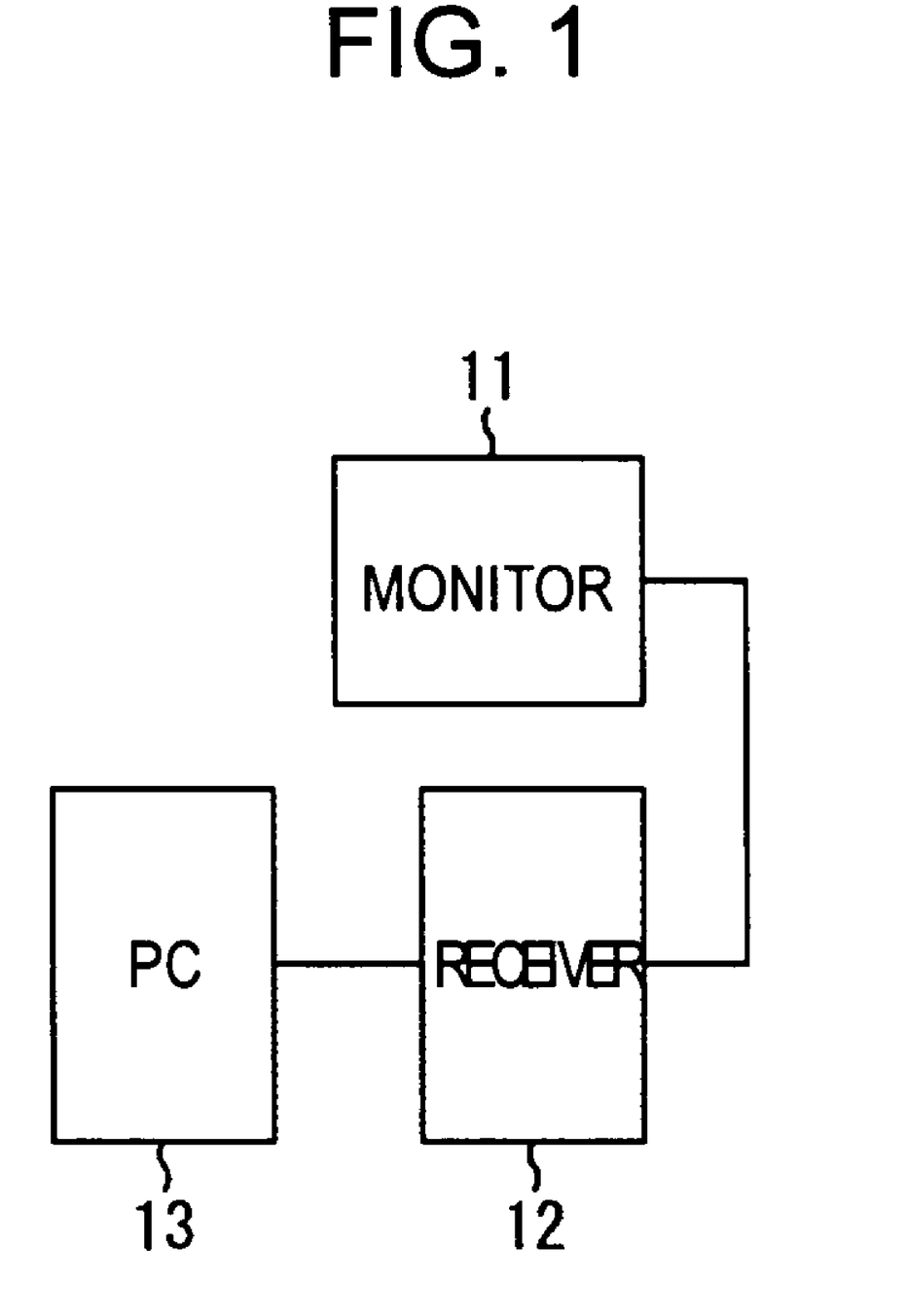
FIG. 1 shows a content recording-and/or-reproduction system according to an embodiment of the present invention.

Hereinafter, embodiments including the above-described embodiments of the present invention will be described with reference to the attached drawings. FIG. 1 shows a content recording-and-reproduction system according to an embodiment of the present invention. In FIG. 1, a monitor 11 produces and transmits an image of contents including image data and speech data, where the contents are transmitted from a personal computer (PC) 13 and/or a receiver 12. The monitor 11 has a digital-visual interface (DVI) and performs communications under a protocol based on high-bandwidth digital content protection (HDCP) functioning as a copyright system adapted to protect digital contents transferred via the DVI from unauthorized copying. Subsequently, the monitor can produce a high-quality (high-resolution) image of contents.

The receiver 12 is formed, for example, as a digital tuner used for a digital broadcast, and configured to receive a digital-broadcast signal and transmit received contents to the monitor 11 and/or the PC 13. More specifically, the receiver 12 converts video data and/or speech data obtained by descrambling scrambled contents received via a digital broadcast into a predetermined signal and externally transmits the predetermined signal. Further, the receiver 12 converts the image quality of the contents, as required. For example, the receiver 12 converts an image of the contents into a low-quality or standard-quality image with a resolution of 525 P or less (hereinafter referred to as a standard-definition (SD) image), or a high-quality image with a resolution of 1125i or more (hereinafter referred to as a high-definition (HD) image), as required. Then, the receiver 12 externally transmits the converted image.

Further, the receiver 12 acquires data on contents stored (recorded) in the PC 13 and transmits the content data to the monitor 11 so that the monitor 11 produces an image of the content data.

The receiver 12 may be operated based on an application that is adapted to operate the receiver 12 and executed by the PC 13. Otherwise, the receiver 12 may be operated based on a signal (command) transmitted from a remote-control unit (remote commander) that is not shown. That is to say, where the receiver 12 receives a digital broadcast and makes the monitor 11 produce an image of contents provided via the digital broadcast, the receiver 12 can be operated independently without being connected to the PC 13.

The detailed configuration of the receiver 12 will be described later with reference to FIG. 2.

The PC 13 executes various applications (programs) that had been installed therein. The various applications include the above-described application adapted to operate the receiver 12.

Further, the PC 13 is connected to the receiver 12 via an IEEE1394 interface, so as to store data on contents transmitted from the receiver 12 in a storage medium such as a hard disk drive (HDD) provided in itself according to an instruction transmitted from a user. Further, the PC 13 transmits data on contents stored therein to the receiver 12 via the IEEE1394 interface according to an instruction of the user.

The PC 13 supports a digital-transmission-content-protection (DTCP) protocol adapted to copyright the contents transferred via the IEEE1394 interface. Where the DTCP protocol is used, the communication destination is authorized before transmitting and/or receiving data. Then, encryption keys are exchanged and data on the contents is encrypted and/or decrypted so that the content data is protected from an unauthorized device. Further, the PC 13 performs control by using copy-control information so that the content data is prevented from being copied, and/or only a single generation of the content data is permitted to be copied.

Further, the PC 13 transmits an image of the screen of a desktop, a graphical user interface (GUI), and so forth, where the image is produced by the executed application, to the monitor 11 via a DVI interface of the receiver 12. Then, the PC 13 makes the monitor 11 produce the image.

Further, the PC 13 is connected to the receiver 12 via a universal-serial-bus (USB) interface and transmits a command or the like generated by the application adapted to operate the receiver 12 to the receiver 12, thereby controlling operations of the receiver 12.

Figure 2:
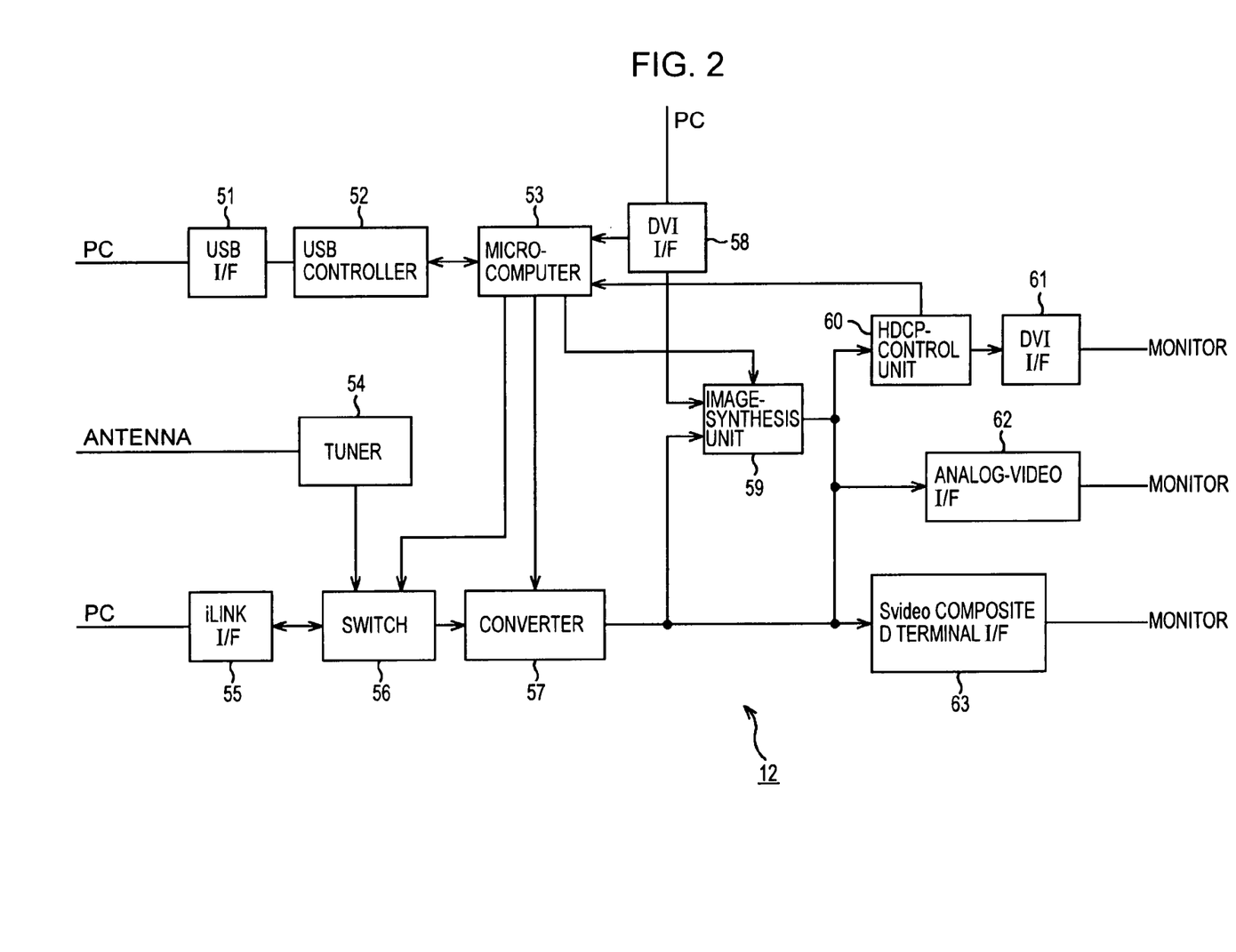
FIG. 2 is a block diagram illustrating an example configuration of a receiver shown in FIG. 1.

FIG. 2 is a block diagram showing the configuration of the receiver 12. A USB I/F 51 functioning as the above-described USB interface acquires a command or the like that is generated by the application adapted to operate the receiver 12 and that is transmitted from the PC 13, and transmits the generated command to the USB controller 52.

A microcomputer 53 is provided, as a downsized computer adapted to perform a predetermined calculation for transmitted data and externally transmits the calculated data based on a software program stored in a read-only memory (ROM) provided in the microcomputer 53. Further, the microcomputer 53 is configured to control each of the units of the receiver 12.

A tuner 54 shown in FIG. 2 receives a signal of a digital broadcast via an antenna, demodulates the received broadcast signal into a stream, and performs error correction or the like. Then, the tuner 54 descrambles the stream that had been scrambled by using descramble information supplied from an integrated-circuit (IC) card that is inserted into the receiver 12, as required, and obtains video data and/or speech data. Then, the tuner 54 transmits the video data and/or the speech data to a switch 56.

An iLINK I/F 55 is provided, as the above-described IEEE1394 interface, and configured to transmit and/or receive content data including image data, speech data, and so forth between itself and the PC 13 with high speed. For example, where the receiver 12 records contents received via a digital broadcast, the content data is transmitted (output) to the PC 13 via the iLINK I/F 55 and the content data is stored in the HDD or the like of the PC 13. Further, where the contents stored (recorded) in the PC 13 are reproduced, the content data stored in the HDD or the like of the PC 13 is received (input) and transmitted to the switch 56 via the iLINK I/F 55.

Further, the iLINK I/F 55 performs communications on an IEEE1394-transmission path under the DTCP protocol for encrypting and transferring data. Subsequently, the iLINK I/F 55 can transfer the contents while protecting the copyright thereof. That is to say, the iLINK I/F 55 provides a secure path adapted to protect the copyright of the contents, where the contents are transmitted and/or received between the receiver 12 and the PC 13.

The switch 56 is configured to switch the source of part of the content data transmitted from the tuner 54 and/or the iLINK I/F 55 to another source under the control of the microcomputer 53, where the part of the content data is transmitted to a converter 57.

The converter 57 converts the image quality of image data on the contents transmitted from the switch 56 under the control of the microcomputer 53. For example, the converter 57 converts image data on transmitted HD-image contents into SD-image data under the control of the microcomputer 53.

A DVI I/F 58 is connected to the PC 13, acquires data on an image of, for example, the desktop screen, the GUI, and so forth transmitted from the PC 13, and transmits the image data to an image-synthesis unit 59.

The image-synthesis unit 59 controls picture-in-picture (PinP) display under the control of the microcomputer 53 so that image data transmitted from the converter 57 is superimposed onto the GUI or the like transmitted from the DVI I/F 58, as required, thus synthesizing an image.

The HDCP-control unit 60 communicates with the monitor 11 connected thereto via a DVI I/F 61, determines the type of the monitor 11, and informs the microcomputer 53 about whether or not the monitor 11 supports HDCP. The HDCP-control unit 60 determines the type of the monitor 11 at predetermined intervals, for example, once every two seconds. Therefore, if the user changes the monitor connected to the DVI I/F 61 to another monitor, the HDCP-control unit 60 can inform the microcomputer 53 about whether or not the monitor supports HDCP without delay.

If the monitor 11 supports HDCP, the DVI I/F 61 provides a secure transmission path configured to protect the copyright of contents, where the contents are transferred (transmitted and/or received) between the receiver 12 and the monitor 11.

An analog-video I/F 62 generates and transmits the signal of an image for an analog-video display. A separated video (SVideo)-composite-D terminal I/F 63 is an I/F that is connected to a TV receiver, and configured to generate and transmit the signal of an image for the TV receiver.

Further, the receiver 12 includes a switch configured to switch the destination of content data to another destination. Subsequently, the destination of an image of the contents transmitted from the image-synthesis unit 59 is switched to the DVI I/F 61, the analog-video I/F 62, and the SVideo-composite-D terminal I/F 63, as required, according to the user's operation of the switch, for example.

Further, the receiver 12 may include a network interface such as a LAN card adapted to acquire data on digital contents via a network, for example.

Figure 3:
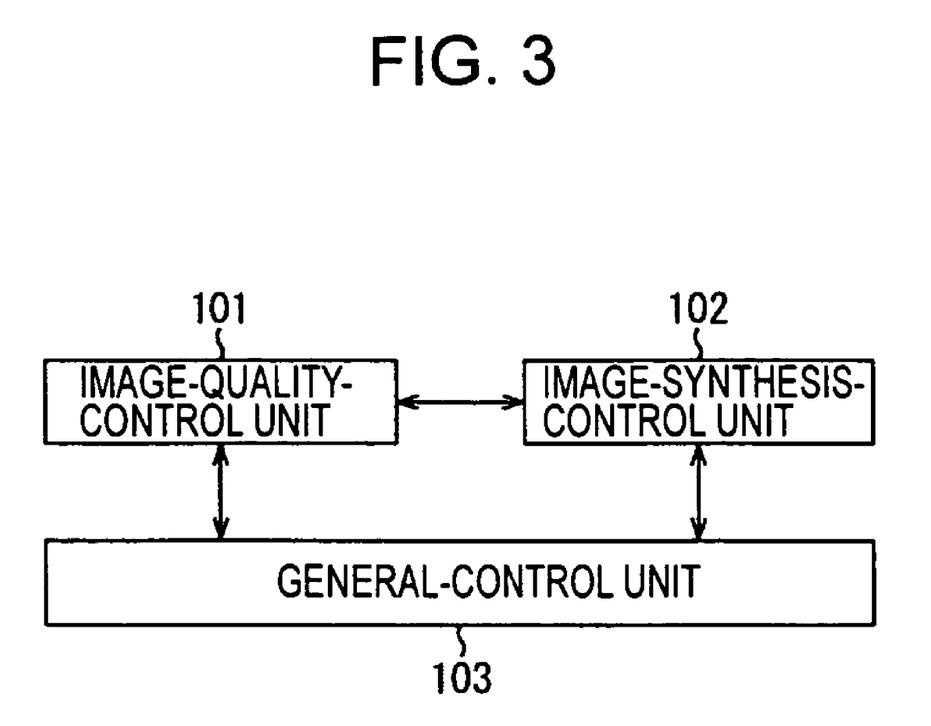
FIG. 3 is a block diagram showing an example functional configuration of software executed by a microcomputer shown in FIG. 2.

FIG. 3 is a block diagram illustrating an example functional configuration of a software program executed by the microcomputer 53 shown in FIG. 2. An image-quality-control unit 101 switches the image quality of contents to another by controlling the converter 57 according to the type of a monitor to which the contents are transmitted.

The image-synthesis-control unit 102 controls the image-synthesis unit 59 according to an instruction (command) transmitted from the PC 13 so that image data transmitted from the converter 57 is superimposed on the GUI image transmitted from the PC 13 via the DVI I/F 58 and transmitted to the monitor 11. Subsequently, the contents are PinP-displayed.

The overall-control unit 103 controls data reception and/or data transmission performed between the image-quality-control unit 101, or the image-synthesis-control unit 102 and the units of the receiver 12.

Next, monitor-type checking performed by the HDCP-control unit 60 will be described with reference to a flowchart shown in FIG. 4. The monitor-type checking is performed, where the monitor connected to the DVI I/F 61 supports the DVI interface.

The HDCP-control unit 60 transmits a monitor-type inquiry to the monitor connected thereto via the DVI I/F 61, at step S1. At step S2, the HDCP-control unit 60 receives information transmitted from the monitor, as a response to the monitor-type inquiry that was transmitted to the monitor, at step S1. Here, the term "monitor type" denotes information specifying a communication method used for transmitting and/or receiving content data between the monitor and the receiver 12.

The monitor-type-inquiry transmission corresponding to step S1 and the response reception corresponding to step S2 are performed according to a predetermined method by a DVI interface, for example. The monitor connected to the DVI I/F 61 transmits information stored in a ROM or the like provided therein, as the response that is received, at step S2. The response received, at step S2 includes information indicating whether or not the monitor supports HDCP.

At step S3, the HDCP-control unit 60 determines whether or not the monitor connected thereto supports HDCP based on the response transmitted, at step S2. IF the monitor is determined to be a monitor supporting HDCP, at step S3, the flow then proceeds to step S4.

The HDCP-control unit 60 determines whether or not an HDCP-capable flag is turned on, at step S4. If it is determined that the HDCP-capable flag is turned off, the flow then proceeds to step S5, so that the HDCP-capable flag is turned on.

Here, the HDCP-capable flag denotes information that is stored in a memory or the like provided in the HDCP-control unit 60 and that indicates whether or not the monitor connected to the HDCP-control unit 60 supports HDCP. Where the monitor supports HDCP, the HDCP-capable flag is turned on. Otherwise, the HDCP-capable flag is turned off.

On the other hand, where it is determined that the monitor does not support HDCP, at step S3, the flow then proceeds to step S6.

The HDCP-control unit 60 determines whether the HDCP-capable flag is turned on or off, at step S6. If it is determined that the HDCP-capable flag is turned on, the flow then proceeds to step S7, so that the HDCP-capable flag is turned off.

After the processing at step S5, or the processing at step S7 is performed, the flow then proceeds to step S8, so that the HDCP-control unit 60 informs the microcomputer 53 of the monitor type. For example, information about the above-described HDCP-capable flag (information indicating whether or not the monitor supports HDCP) is transmitted, as the monitor type.

Further, if it is determined that the HDCP-capable flag is turned on, at step S4, or if it is determined that the HDCP-capable flag is turned off, at step S6, the processing corresponding to steps S5 and S8, or the processing corresponding to steps S7 and S8 is not performed.

At step S9, the HDCP-control unit 60 determines whether or not a predetermined time period (e.g., two seconds) elapsed and waits until it is determined that the predetermined time period elapsed. If it is determined that the predetermined time period elapsed, at step S9, the flow then returns to step S1, so that the processing from step S1 on down is performed again.

Thus, the type of monitor 11 connected to the receiver 12, for example, whether or not the monitor 11 supports HDCP, is continuously checked. Subsequently, if the type of the monitor 11 is changed, it becomes possible to inform the microcomputer 53 of the change. Further, the monitor-type information (information about whether or not the monitor supports HDCP) transmitted from the HDCP-control unit 60 to the microcomputer 53 is held in the memory or the like provided in the microcomputer 53 until the next monitor-type information is transmitted.

Figure 5:
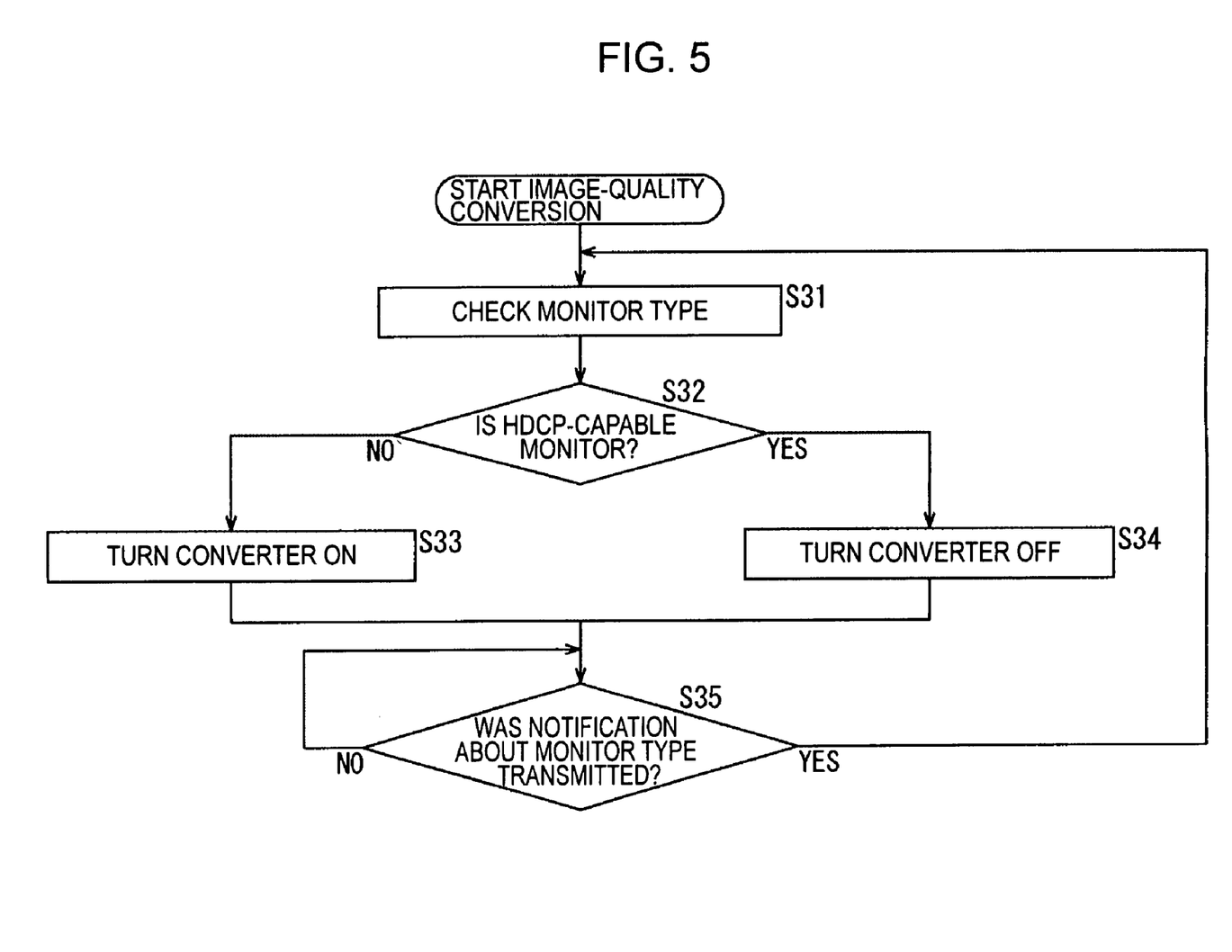
FIG. 5 is a flowchart illustrating the image-quality conversion.

Next, image-quality conversion performed by the receiver 12 will be described with reference to a flowchart shown in FIG. 5. The image-quality conversion is performed, where the DVI I/F 61 is selected, as the destination of an image of the contents by a switch or the like configured to switch the destination of contents to another.

The image-quality-control unit 101 shown in FIG. 3 of the microcomputer 53 checks the monitor type, at step S31. At that time, the monitor-type information transmitted and held in the microcomputer 53 by the processing described above with reference to FIG. 4, that is, the information indicating whether or not the monitor connected to the receiver 12 supports HDCP is checked.

At step S32, the image-control unit 101 determines whether or not the monitor connected to the receiver 12 supports HDCP based on the checking result obtained, at step S31.

If it is determined that the monitor does not support HDCP, at step S32, the flow then proceeds to step S33, so that the image-quality-control unit 101 turns the operation mode of the converter 57 on. Subsequently, if the image data on the contents transmitted from the switch 56 is HD-image data, the converter 57 operates so that the image data is converted into SD-image data and the SD-image data is externally transmitted. Further, if the image data on the contents transmitted from the switch 56 is the SD-image data, the converter 57 operates, so as not to convert the image quality of the SD-image data.

If the monitor connected to the receiver 12 does not support HDCP, a secure path adapted to transfer the content data is not provided. Therefore, high-quality-image (HD image) data is converted into a standard-quality image (SD image) and transmitted to the monitor. As a result, where digital contents are transmitted to a display device that does not support HDCP, where the display device includes a monitor, a display, and so forth, it becomes possible to protect the copyright of contents based on the ARIB standard adapted to reduce the resolution of the digital contents to a predetermined level (e.g., 525 p) or less.

On the other hand, if it is determined that the monitor supports HDCP, at step S32, the flow then proceeds to step S34 so that the image-quality-control unit 101 turns the operation mode of the converter 57 off. Subsequently, the converter 57 operates, so as not to convert the image quality of the image data included in the contents transmitted from the switch 56. That is to say, even though the image data is the HD-image data, the image data is not converted into SD-image data.

If the monitor connected to the receiver 12 supports HDCP, a secure path adapted to transfer the content data is provided. Therefore, even though high-quality-image (HD image) data is transmitted in its original state to the monitor, the copyright of the contents can be appropriately protected.

The data on an image transmitted from the converter 57 is transmitted to the HDCP-control unit 60, and the DVI I/F 61 via the image-synthesis unit 59. After that, the image data is transmitted to a monitor (e.g., the monitor 11) connected to the DVI I/F 61.

After the processing corresponding to either step S33 or step S34 is performed, the flow then proceeds to step S35, so that the image-quality-control unit 101 determines whether or not information about the monitor type is transmitted and waits until it is determined that new monitor-type information is transmitted from the HDCP-control unit 60.

If it is determined that the new monitor-type information is transmitted from the HDCP-control unit 60, at step S35, that is to say, where the monitor connected to the receiver 12 is switched to another monitor, for example, the flow then returns to step S31 so that the processing from step S31 on down is performed again.

Thus, the image quality of contents is converted (switched) according to the type of a monitor connected to the receiver 12. Subsequently, it becomes possible to provide digital contents of an appropriate quality while protecting the copyright of the digital contents.

Figure 6:
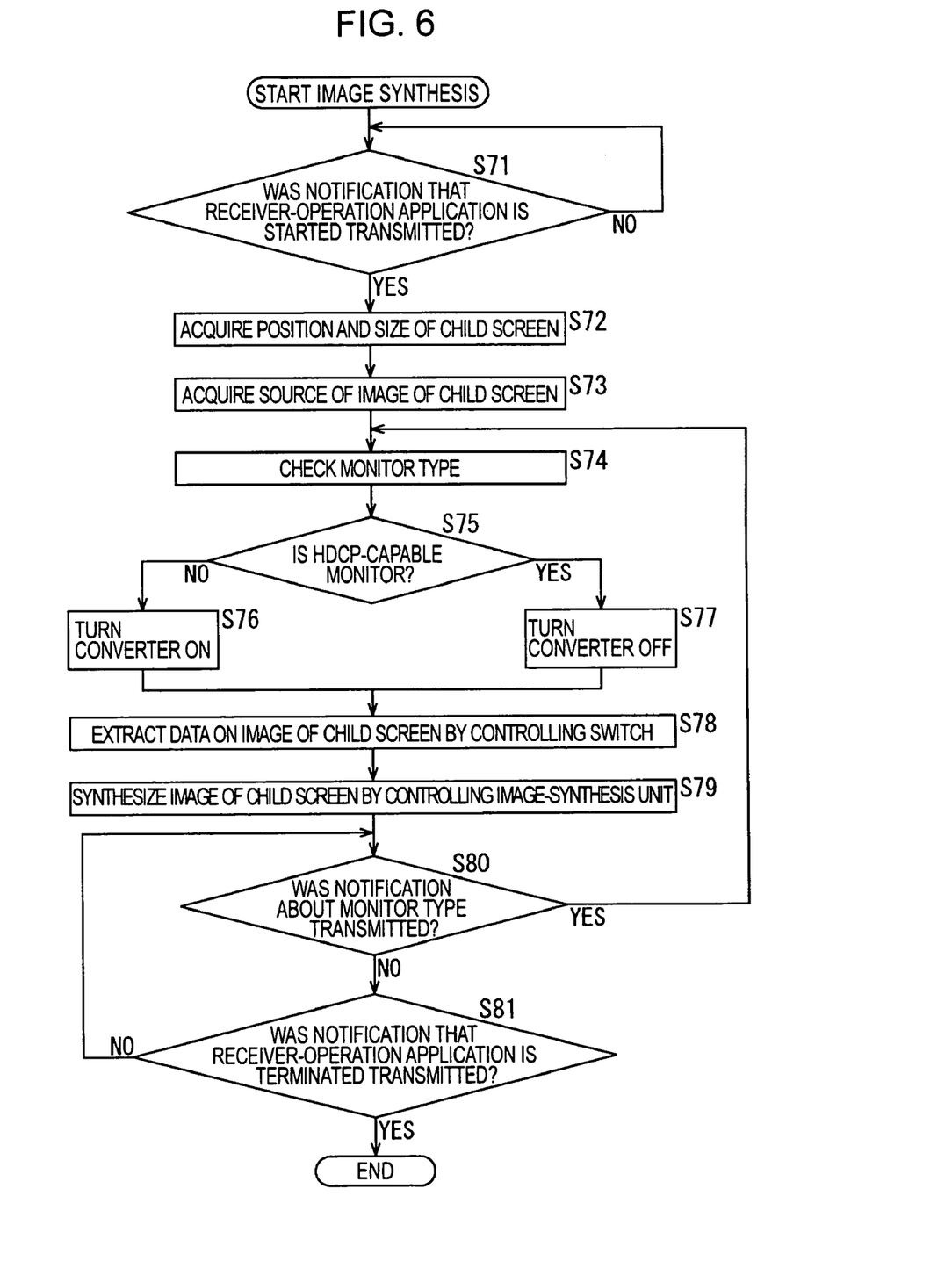
FIG. 6 is a flowchart illustrating the image synthesis.

Next, image synthesis will be described with reference to a flowchart shown in FIG. 6. The image synthesis is performed by the receiver 12 so that an image of the digital contents is PinP-displayed on a display image of the desktop screen, the GUI, and so forth transmitted from the PC 13.

At step S71, the image-synthesis-control unit 102 shown in FIG. 3 of the microcomputer 53 determines whether or not the PC 13 transmitted information indicating that the application adapted to operate the receiver 12 is started and waits until it is determined that information indicating that the operation application is started was transmitted.

Where the application that is installed in the PC 13 and that is adapted to operate the receiver 12 is started according to an instruction or the like transmitted from the user, information indicating that the application is started is transmitted to the receiver 12 via the USB I/F 51. At that time, the PC 13 transmits data on the GUI image and/or data on an image of the background of the GUI (e.g., an image of the desktop screen) to the DVI I/F 58 of the receiver 12.

Figure 7:
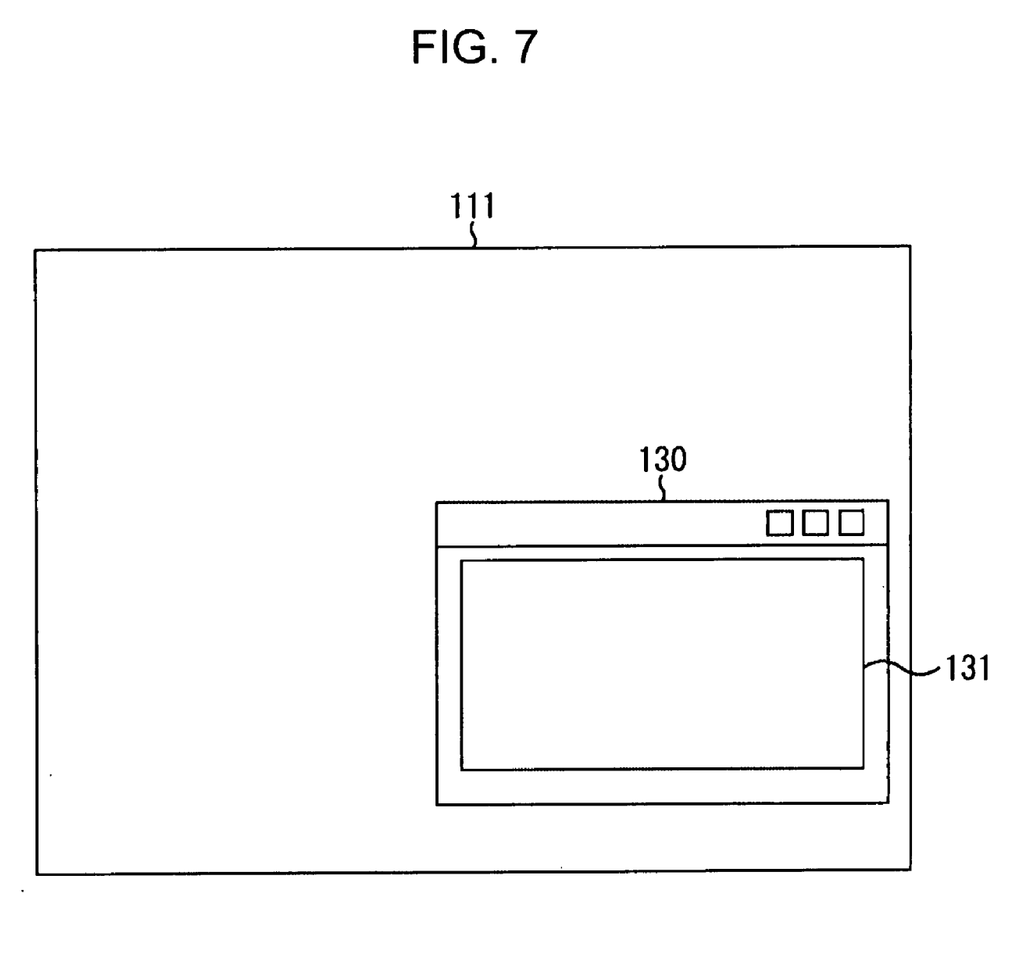
FIG. 7 shows an example display image of a GUI of an application configured to operate the receiver.

Subsequently, a GUI 130 is shown on a screen 111 of the monitor 11, as shown in FIG. 7. The GUI 130 can be shown in an arbitrary size and at an arbitrary position on the screen 111 according to an instruction or the like transmitted from the user. Display data on the GUI 130 is generated by the PC 13 and acquired via the DVI/IF 58. However, display data on an image shown in a child screen 131 that is a predetermined display area provided in the GUI 130 is acquired via the tuner 54 and the iLINK I/F 55.

Figure 8:
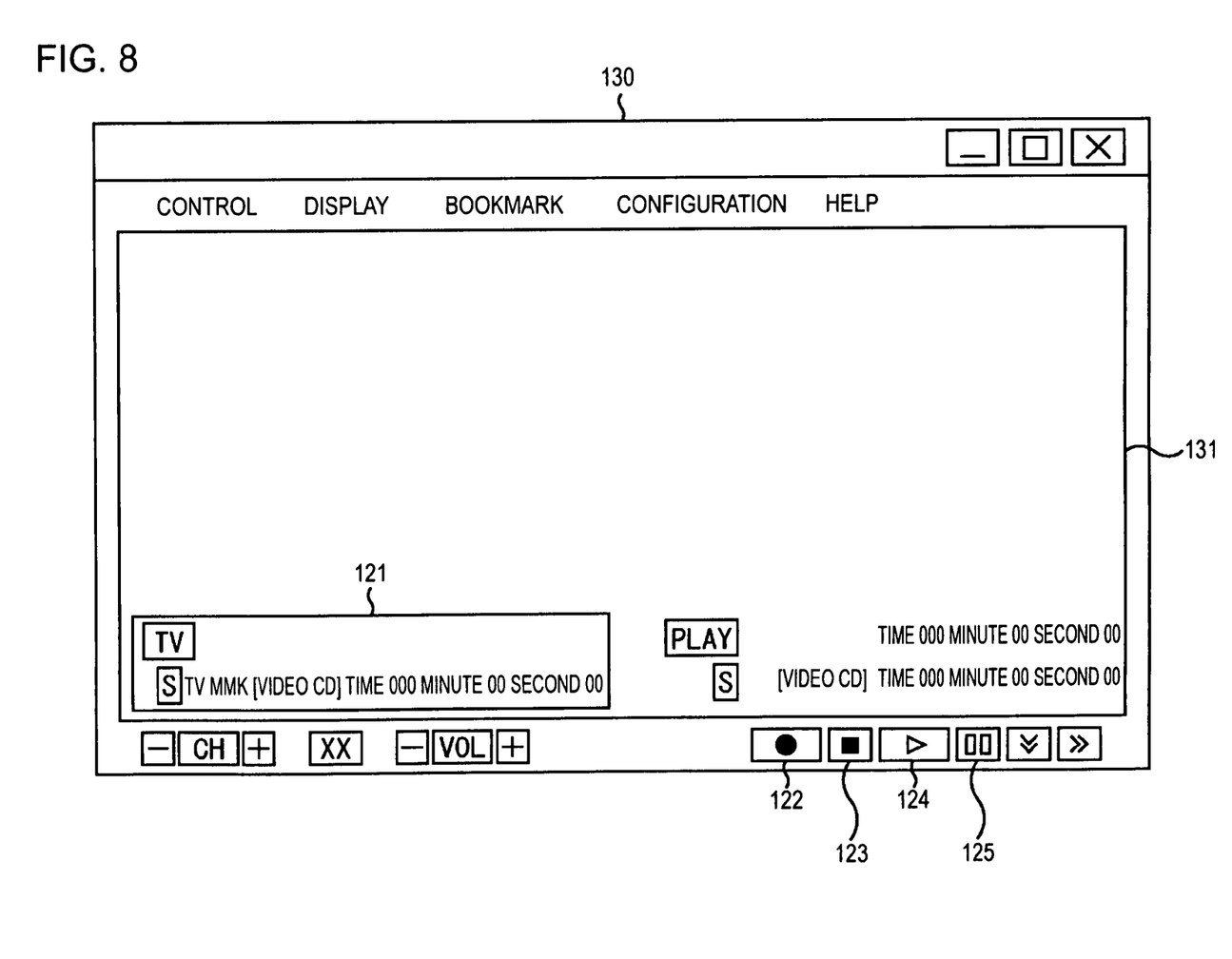
FIG. 8 shows an example specific display image of the GUI shown in FIG. 7.

FIG. 8 shows an example detailed display image of the GUI 130 shown in FIG. 7. The GUI 130 is the application adapted to operate the receiver 12 and shown during an application adapted to record and/or reproduce broadcasted digital contents is opened. For example, a channel on which the digital contents are broadcasted, a record mode, and so forth are set on a window 121, as shown in FIG. 8. A button 122 is provided to transmit an instruction to record displayed contents, a button 123 is provided to transmit an instruction to terminate the contents recording, a button 124 is provided to transmit an instruction to reproduce the recorded contents, and a button 125 is provided to transmit an instruction to stop reproducing of the contents.

The child screen 131 produces, for example, an image of digital contents provided via a digital broadcast received and transmitted from the tuner 54, digital contents (reproduced recorded contents) that is stored (recorded) in the PC 13 and transmitted from the receiver 12 via the iLINK I/F 55, and so forth.

In addition to the above-described buttons 122 to 125, various buttons including a control button configured to control the volume and/or image quality of contents may be displayed, as required.

If it is determined that information indicating the application adapted to operate the receiver 12 is started is transmitted, at step S71, the flow then proceeds to step S72 so that the image-synthesis-control unit 102 acquires information about the display position and size of the child screen 131. At that time, the image-synthesis-control unit 102 acquires information about the size of the child screen 13 from the PC 13 via the USB I/F 51, where the information indicates the coordinates of the upper-left corner, and the length and width of the child screen 131.

The image-synthesis-control unit 102 acquires information indicating the source of an image produced on the child screen 131, at step S73. Here, the term "source" denotes the source of data on the image produced on the child screen 131. At that time, the image-synthesis-control unit 102 acquires information about either contents transmitted from the tuner 54 or contents acquired via the iLINK I/F 55 from the PC 13 via the USB I/F 51, as the information indicating the source of the image produced on the child screen 131.

The image-quality-control unit 101 shown in FIG. 3 checks the monitor type, at step S74. At that time, the monitor-type information transmitted and held in the microcomputer 53 by the processing described above with reference to FIG. 4, that is, the information indicating whether or not the monitor connected to the receiver 12 supports HDCP is checked.

At step S75, the image-control unit 101 determines whether or not the monitor connected to the receiver 12 supports HDCP based on the checking result obtained, at step S74.

If it is determined that the monitor does not support HDCP, at step S75, the flow then proceeds to step S76, so that the image-quality-control unit 101 turns the operation mode of the converter 57 on. Subsequently, if the image data on the contents transmitted from the switch 56 is HD-image data, the converter 57 operates so that the image data is converted into SD-image data and the SD-image data is externally transmitted. Further, if the image data on the contents transmitted from the switch 56 is the SD-image data, the converter 57 operates, so as not to convert the image quality of the SD-image data.

On the other hand, if it is determined that the monitor supports HDCP, at step S75, the flow then proceeds to step S77, so that the image-quality-control unit 101 turns the operation mode of the converter 57 off. Subsequently, the converter 57 operates, so as not to convert the image quality of the image data on the contents transmitted from the switch 56. That is to say, even though the image data is the HD-image data, the image data is not converted into the SD-image data.

After the processing corresponding to step S76 or step S77 is performed, the image-synthesis-control unit 102 extracts data on the child-screen image from the image source of the child screen 131 by controlling the switch 56. At that time, the image-synthesis-control unit 102 controls the switch 56 based on the information that is acquired, at step S73, and that indicates the source configured to supply an image of the child screen 131. Subsequently, image data on either contents transmitted from the tuner 54 or contents acquired via the iLINK I/F 55 is transmitted from the switch 56 to the converter 57.

Subsequently, the image data transmitted from the converter 57 is transmitted to the image-synthesis unit 59.

At step S79, the image-synthesis-control unit 102 controls the image-synthesis unit 59, so that the image data on the child screen 131 transmitted, at step S78, is synthesized for the GUI 130 shown in FIG. 8 based on the information that is acquired, at step S72, and that indicates the display position and size of the child screen 131. Then, the synthesized image data is PinP-displayed on the GUI 130 shown in FIG. 8. More specifically, the image data transmitted from the image-synthesis unit 59 is transmitted to the monitor 11 via the HDCP-control unit 60 and the DVI I/F 61, and PnP-displayed on the monitor 11. Subsequently, a GUI-screen image shown in FIG. 9 and a background image (e.g., the desktop-screen image) are produced on the monitor 11.

FIG. 9 shows the example where an image of the child screen 131 is synthesized and PinP-displayed on the GUI 130 shown in FIG. 8. As shown in FIG. 9, an image produced based on the data on the image source of the child screen 131 is shown on the child screen 131, where the data is transmitted, at step S78.

The image-control unit 101 determines whether or not new information about the monitor type was transmitted from the PC 13, at step S80. If it is determined the monitor-type information is transmitted, the flow then returns to step S74 and the processing from then on is performed again. If it is determined that the monitor-type information was not transmitted, at step S80, the flow then proceeds to step S81.

The image-synthesis-control unit 102 determines whether or not information indicating that the application configured to operate the receiver 12 was transmitted, at step S81. If it is determined that the information was not transmitted, the processing returns to step S80.

When the application configured to operate the receiver 12 is started in the PC 13, the information indicating that the application was terminated is transmitted to the receiver 12 via the USB I/F 51. If it is determined that the information was transmitted, at step S81, the processing is terminated.

In the above-described manner, the digital-contents image is PinP-displayed on the GUI 130 and the background image such as the desktop screen. The digital-contents image is merged with the GUI 130 of the PC 13 and the background image in the receiver 12. Therefore, if the digital contents are protected from copying, that is, where data on the digital contents are protected from copying, the digital-contents image can be freely PinP-displayed.

Further, since it is continually checked whether or not the monitor connected to the receiver 12 supports HDCP, the copyright of contents can be protected based on the above-described ARIB standard. Further, it becomes possible to provide digital contents of an appropriate level of quality, while protecting the copyright of the digital contents.

In the above-described embodiments, the transmission path secure and suitable for protecting the copyright of contents is achieved when the contents are transferred under the HDCP protocol or the DTCP protocol. However, the contents can be transferred with security under other protocols.

Further, according to the above-described embodiments, the receiver 12 and the PC 13 are provided in different cabinets. However, the functions of the receiver 12 can be provided in the PC 13. In that case, the PC 13 is configured, as shown in FIG. 10, for example.

Figure 10:
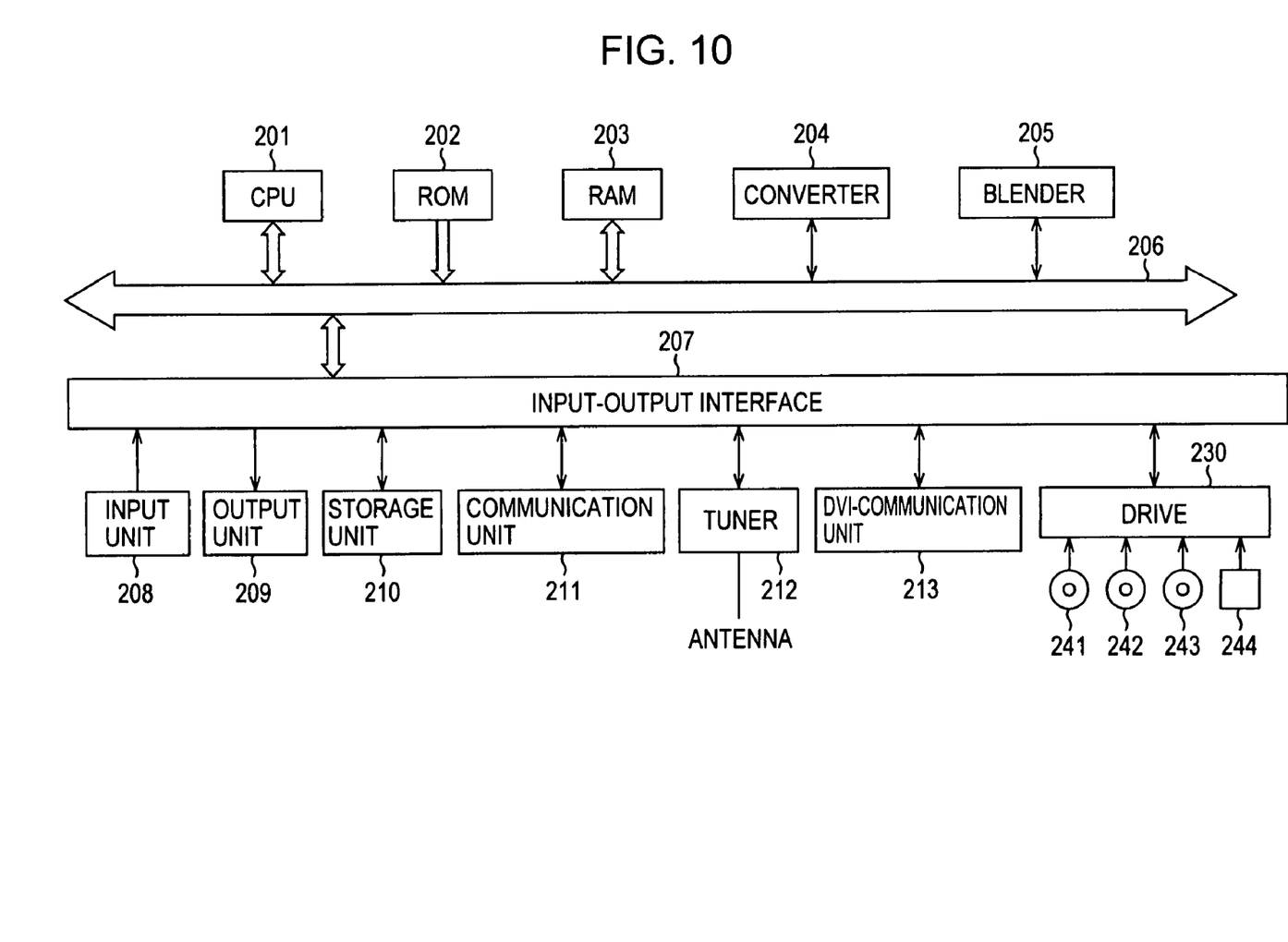
FIG. 10 is a block diagram illustrating an example configuration of a personal computer.

FIG. 10 is a block diagram illustrating an example configuration of the PC 13. In FIG. 10, a central processing unit (CPU) 201 executes various types of processing based on a program stored in a read-only memory (ROM) 202, or a program loaded from a storage unit 210 into a random-access memory (RAM) 203. The RAM 203 stores data necessary for the CPU 201 to execute the various types of processing, as required.

A converter 204 corresponds to the converter 57 shown in FIG. 2. The converter 204 switches the quality of an image of contents to another under the control of the CPU 201. A blender 205 corresponds to the image-synthesis unit 59 shown in FIG. 2 and controls a PinP-displayed image of the contents under the control of the CPU 201.

The CPU 201, the ROM 202, the RAM 203, the converter 204, and the blender 205 are connected to one another via a bus 206. An input-and-output interface 207 including an IEEE1394 interface, a DVI interface, and so forth is connected to the bus 206.

An input unit 208 including a keyboard, a mouse, and so forth, an output unit 209 including the monitor 11 or the like, a storage unit 210 including a hard disk or the like, and a communication unit 211 including a modem, a terminal adapter, a LAN card, and so forth are connected to the input-and-output interface 207.

Further, a tuner 212 and a DVI-communication unit 213 are connected to the input-and-output interface 207. The tuner 212 corresponds to the tuner 54 shown in FIG. 2. The tuner 212 is configured to receive a digital broadcast and transmit data on digital contents. The DVI-communication unit 213 corresponds to the DCP-control unit 60 shown in FIG. 2. The DVI-communication unit 213 is configured to communicate with a device such as the monitor 11 connected to the output unit 209 via the DVI interface and transmit information indicating whether or not the device supports HDCP to the CPU 201.

The converter 204, the blender 205, and the DVI-communication unit 213 can be configured, as a functional block of a software program executed by the CPU 201, so as to achieve the above-described functions.

In another embodiment, the microcomputer 53 shown in FIG. 2 is configured, as the PC 13 shown in FIG. 10. In that case, the CPU 201 executes the software program shown in FIG. 3, so as to achieve the functions of the receiver 12.

A drive 230 is also connected to the input-and-output interface 207. Storage mediums including a magnetic disk 241, an optical disk 242, a magneto-optical disk 243, a semiconductor memory 244, and so forth are connected to the drive 230, as required. A computer program read from any one of the storage mediums is installed into the storage unit 210, as required.

The above-described series of processing procedures can be performed by hardware and/or software. Where the software is used to perform the above-described processing procedures, a program included in the software is installed via a network such as the Internet, or from any one of the above-described storage mediums 241 to 244.

Further, in this specification, steps for executing the above-described series of processing procedures are not necessarily performed in time sequence according to the written order. That is to say, the steps can be performed in parallel and/or separately.

It should be understood by those skilled in the art that various modifications, combinations, sub-combinations and alterations may occur depending on design requirements and other factors insofar as they are within the scope of the appended claims or the equivalents thereof.

What is claimed is:

1. An information-processing apparatus comprising:
   means for acquiring information about a communication-method type from a display device connected to the information-processing apparatus;
   means for determining whether a communication method used by the display device to transmit and/or receive data included in digital contents uses a predetermined copyright-protection technology based on the communication-method-type information;
   means for converting an image quality of the digital contents based on the determination result; and
   means for transmitting the converted digital contents to the display device.

2. An information-processing apparatus according to claim 1, wherein where it is determined that the communication method of the display device does not use the predetermined copyright-protection technology, the means for converting converts the image quality of the digital contents.

3. An information-processing apparatus according to claim 2, wherein where a first image of the digital contents has a predetermined resolution or higher, the means for converting converts the first image into a second image having a resolution lower than the predetermined resolution.

4. An information-processing apparatus according to claim 1, wherein the means for acquiring acquires the information about the communication method-type from the display device at predetermined time intervals while the digital contents are transmitted to the display device.

5. An information-processing apparatus according to claim 1, wherein the digital contents are provided via a digital broadcast, and the information-processing apparatus further comprises means for receiving the digital broadcast and means for extracting data corresponding to the digital contents.

6. An information-processing apparatus according to claim 1, wherein the digital contents are stored in at least one storage medium and the information-processing apparatus further comprises means for extracting data corresponding to the digital contents from the storage medium according to a method appropriate for protecting a copyright of the digital contents.

7. An information-processing method comprising:
acquiring information about a communication-method type from a display device connected to an information-processing apparatus;
determining whether a communication method used by the display device to transmit and/or receive data included in digital contents uses a predetermined copyright-protection technology based on the communication-method-type information;
controlling conversion of an image quality of the digital contents based on the determination result; and
outputting the converted digital contents to the display device.

8. A storage medium storing a program used for an information-processing apparatus configured to acquire data on digital contents, and record and/or reproduce the digital contents, wherein the program makes a computer execute the steps of:
controlling acquisition of information about a communication-method type from a display device connected to the information-processing apparatus;
controlling determination of whether a communication method used by the display device to transmit and/or receive data included in digital contents uses a predetermined copyright-protection technology based on the communication-method-type information; and
controlling conversion of an image quality of the digital contents transmitted to the display device based on the determination result.

9. An information-processing apparatus comprising:
an acquisition unit configured to acquire information about a communication-method type from a display device connected to the information-processing apparatus;
a determination unit configured to determine whether a communication method used by the display device to transmit and/or receive data included in digital contents uses a predetermined copyright-protection technology based on the communication-method-type information;
a conversion unit configured to convert an image quality of the digital contents based on the determination result; and
an output unit configured to transmit the converted digital contents to the display device.

* * * * *